(12) United States Patent
Wilson, II (10) Patent No.: US 11,912,349 B1
(45) Date of Patent: Feb. 27, 2024

(54) TOWABLE VEHICLE EQUIPMENT CARRYING APPARATUS

(71) Applicant: Richard E. Wilson, II, Grants Pass, OR (US)

(72) Inventor: Richard E. Wilson, II, Grants Pass, OR (US)

(*) Notice: Subject to any disclaimer, the term of this patent is extended or adjusted under 35 U.S.C. 154(b) by 199 days.

(21) Appl. No.: 17/719,257

(22) Filed: Apr. 12, 2022

Related U.S. Application Data (60) Provisional application No. 63/220,378, filed on Jul. 9, 2021.

(51) Int. Cl.
*B62D 43/02* (2006.01)
*B60D 1/58* (2006.01)
*B60R 11/06* (2006.01)
*B60R 9/06* (2006.01)

(52) U.S. Cl.
CPC .............. *B62D 43/02* (2013.01); *B60D 1/58* (2013.01); *B60R 9/06* (2013.01); *B60R 9/065* (2013.01); *B60R 11/06* (2013.01)

(58) Field of Classification Search
CPC ........... B60R 9/06; B60R 9/065; B60R 11/06; B62D 43/02
See application file for complete search history.

(56) References Cited

U.S. PATENT DOCUMENTS

| | | | |
|---|---|---|---|
| 6,659,318 B2 | 12/2003 | Newbill | |
| 6,820,887 B1 | 11/2004 | Riggle | |
| 6,874,804 B2 | 4/2005 | Resse et al. | |
| 7,249,927 B2 | 7/2007 | Wooten et al. | |
| 7,533,789 B1* | 5/2009 | Seely | B60R 9/06 224/519 |
| 7,591,404 B2 | 9/2009 | LeDue et al. | |
| 8,393,360 B2 | 3/2013 | Brakefield et al. | |
| 8,720,760 B1 | 5/2014 | Simpson | |
| 8,777,070 B2* | 7/2014 | Moore | B60R 11/06 414/466 |
| 9,199,677 B2* | 12/2015 | Hendrickson | B62D 43/02 |
| 9,216,698 B2* | 12/2015 | Rhodes | B60R 9/065 |
| 9,333,822 B1* | 5/2016 | LaFave | B60R 9/06 |
| 11,840,197 B2* | 12/2023 | Niemela | B60R 9/06 |
| 2013/0221042 A1 | 8/2013 | Fortner | |

* cited by examiner

*Primary Examiner* — Justin M Larson
(74) *Attorney, Agent, or Firm* — Jerry Haynes Law (57) ABSTRACT

A towable vehicle equipment carrying apparatus provides a portable, organizable reinforced container adapted to carry vehicle-related accessories. The vehicle-related accessories can include items needed at automotive events, such as autocross or high-performance driving events. The reinforced container is sufficiently small and lightweight in dimensions, so as to facilitate towing thereof. The container can be easily hitched to a vehicle for towing. The container includes a hitch, such as a dual right-angle extension hitch, which is adapted for coupling with a receiver hitch on a vehicle, so as to be towed. The reinforced container can retain a fuel canister, a drawer to retain tools, at least one wheel retention pole to retain spare wheels, and multiple hooks to retain a jack. The reinforced container is sufficiently small and lightweight in dimensions, so as to facilitate towing thereof.

20 Claims, 11 Drawing Sheets

TOWABLE VEHICLE EQUIPMENT CARRYING APPARATUS

CROSS-REFERENCE TO RELATED APPLICATIONS

This application claims priority from U.S. Provisional Application Ser. No. 63/220,378, entitled "Towable Vehicle Equipment Carrying Apparatus", filed on Jul. 9, 2021, which application is hereby incorporated herein by reference in its entirety.

FIELD OF THE INVENTION

The present invention relates generally to an apparatus mountable to a vehicle. More so, the present invention relates to a towable vehicle equipment carrying apparatus that is mountable to a vehicle.

BACKGROUND OF THE INVENTION

The following background information may present examples of specific aspects of the prior art (e.g., without limitation, approaches, facts, or common wisdom) that, while expected to be helpful to provide additional aspects of the prior art, is not to be construed as limiting the present invention, or any embodiments thereof, to anything stated or implied therein or inferred thereupon.

Motor vehicles are often used for outdoor leisure and recreational activities such as camping, fishing, picnicking at the beach or a park, cookouts, road trips, and tailgate parties at sporting events or other social activities. This activity is commonly referred to as tailgating. Many car enthusiasts participate in events at remote locations that necessitate a need for a diverse set of tires, a jack, tools, fuel, etc. to be transported to the event location. Traditionally either the car is loaded up to carry the loads/cargo while either compromising the cargo or people carrying capacity of the car/vehicle, further some items are large enough that do not fit comfortably into a vehicle or would cause odors if inside the vehicle thereby compelling to use a trailer that is required to be attached to the vehicle on the drive there or at the event. Sometimes instead of a trailer, a special vehicle such as a pickup truck, sport utility vehicle, or recreational vehicle is used to carry the cargo, thereby the use of the trailer and/or the special vehicle may lead to require additional parking space for the trailer in addition to the other deficiencies.

Further in addition to recreational accessories, it is required to have an easy attachment and/or storage of additional tires, fuel container, jack, tool box, gas cylinder, etc. to be carried during travel to the event spot for easy and quick access and use of these items as and when required. Most pickup trucks available on the market today come equipped with a standard spare tire carrier but are inconvenient to use and operate, further these innovations do not provide easy and quick handling of other recreational accessories in addition to conveniently holding and using one or more spare tires and vehicle accessories.

Numerous attempts have been made and several prior art devices are known for variety of spare tire carrier, storage rack for a vehicle or several types of vehicle equipment carrying devices. Even though these innovations may be suitable for the specific purposes to which they address, however, they would not be as suitable for the purposes of the present invention.

For example, U.S. Pat. No. 6,659,318 to Newbill discloses a spare tire carrier for securement to an end segment of a vehicle bumper and having a swingable arm for travel about horizontal and vertical axes to relocate a spare tire away from the rear of a vehicle and subsequently downward into ground contact.

For example, U.S. Pat. No. 6,820,887 to Riggle relates to a dolly for towing trailers to reduce the probability of chassis and body damage, enable horizontal alignment of the trailer for level towing and greater weight distribution, and provide self-steering of the dollies as the towing vehicle turns or backs up.

For example, U.S. Pat. No. 6,874,804 to Reese et al. describes a Universal hitch and receiver assembly comprising at least an additional vertical box receiver, an additional horizontal box receiver. The box receivers are used to hold and support various accessory devices. Further the assembly comprises a hitch ball that can be used to tow a trailer without removal of the accessory device.

For example, U.S. Pat. No. 7,249,927 to Wooten et al. relates to a storage rack for a vehicle comprising a load supporting structure, a swing arm assembly, a lift assembly, and a lever connected each other to fold or unfold the rack, wherein the lever forming a ramp to roll the load/tire up/down the ramp while lifting and lowering the load/tire.

For example, U.S. Pat. No. 7,591,404 to LeDue et al. teaches a swingable apparatus that is selectively attachable to a vehicle, for transporting a device and positioning the device in an orientation that permits access to the vehicle. 8393360

For example, U.S. Pat. No. 8,393,360 to Brakefield et al. discloses a portable system for transferring liquids such as fuels from a first tank to a second tank.

For example, U.S. Pat. No. 8,720,760 to Simpson relates to a spare tire carrier comprising a T-shaped frame configured to mounted on a receiver-type hitch of a recreational vehicle. The carrier has a lever-actuated lifting and lowering apparatus to allow a single person to remove and replace a spare tire on the carrier and/or to swing the carrier and spare tire out of the way the rear of the vehicle can still be accessed.

For example, U.S. Pat. Application No. 2013/0221042 to Fortner describes a spare tire carrying systems attached to a vehicle. The system comprises a pivotable arm that may be raised and lowered to load and unload the tire.

It is apparent now that numerous innovations that are adapted to a variety of vehicle equipment carrying apparatus have been developed in the prior art that are adequate for various purposes. Furthermore, even though these innovations may be suitable for the specific purposes to which they address, accordingly, they would not be suitable for the purposes of the present invention as heretofore described. Thus, a towable portable vehicle equipment carrying apparatus that is configured to carry vehicle accessories, recreation accessories, spare tire, tool box etc. and allows easy and quick management of the accessories is needed.

SUMMARY OF THE INVENTION

The present invention relates generally to a towable vehicle equipment carrying apparatus. More so, the present invention relates to a carrying apparatus that includes a reinforced container with a dual right angle extension hitch adapted for coupling with a receiver hitch on a vehicle, so as to tow the container; and the reinforced container retains a fuel canister, a drawer to retain tools, a pair of lateral bars to retain spare wheels, and multiple hooks to retain a jack.

According to an aspect of a towable vehicle equipment carrying apparatus, comprises: a reinforced container having a front wall, a rear wall, a bottom wall, and a pair of side walls, the walls forming a cavity sized and dimensioned to retain at least one vehicle-related accessory, the rear wall comprising at least one hook adapted to carry a jack, and at least one lighting signal, the sidewalls defining a pair of aligned holes; a hitch adapted to detachably couple the container to a corresponding receiver hitch of a vehicle; a wheel retention pole centrally disposed through the holes in the sidewalls, the wheel retention pole terminating at a pair of free ends, the wheel retention pole adapted to carry at least one wheel or tire; a pair of security flanges joined with the free ends of the wheel retention pole, the security flanges selectively restricting passage of the wheel or tire past the free ends of the wheel retention pole; and multiple mobile members operatively joined at the bottom wall, the mobile members enabling mobility of the container when being towed.

In another aspect, the rear wall comprises at least one drawer adapted to slide in and out of the cavity, and contain the at least one vehicle-related accessory.

In another aspect, the apparatus further comprises a rear hitch adapted to enable hitching to a vehicle.

In another aspect, the vehicle-related accessory includes at least one of the following: a fuel canister, a tool, and an auto part.

In another aspect, the reinforced container defines a cubicle or rectangular shape.

In another aspect, the reinforced container comprises reinforced steel, titanium, or metal alloy.

In another aspect, the hitch comprises a dual right-angle extension hitch.

In another aspect, the pair of security flanges comprises threaded spinners. In another aspect, the free ends 204*a-b* of the wheel retention pole is threaded.

In another aspect, the multiple mobile members comprise at least a pair of wheels.

One objective of the present invention is to provide a towable container 102 for carrying vehicle accessories to an autocross or HPDE.

Another objective is to assist auto enthusiasts who compete in high performance drivers events, autocross, or track racing to carry spare wheels, fuel canisters, jacks, and additional vehicle accessories.

Yet another objective is to easily organize vehicle-related accessories for a car enthusiast event.

Yet another objective is to carry items needed that do not fit comfortably into a vehicle or would cause odors if inside the vehicle.

Yet another objective is to provide a reinforced towable container that protects fuel canisters from impactful force.

Yet another objective is to retain wheels and tires along a removable wheel retention pole.

Yet another objective is to provide a towable vehicle equipment carrying apparatus 100 that easily hitches to a vehicle for towing.

These and other objectives, advantages and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear,"

Figure 1:
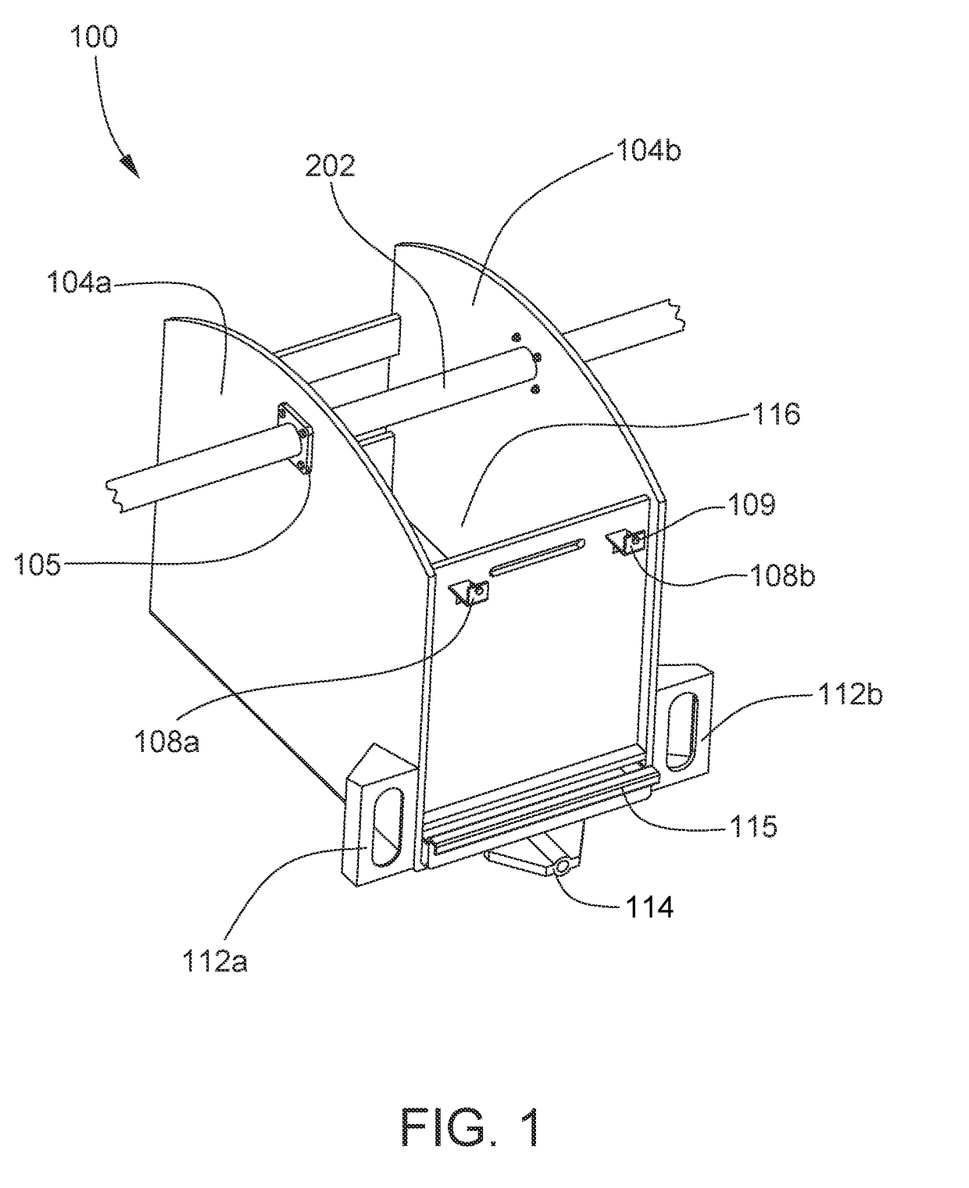
FIG. 1 illustrates a rear perspective view of an exemplary towable vehicle equipment carrying apparatus, in accordance with an embodiment of the present invention.

"right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting unless the claims expressly state otherwise.

A towable vehicle equipment carrying apparatus 100 is referenced in FIGS. 1-10. The towable vehicle equipment carrying apparatus 100, hereafter "apparatus 100" provides a portable, organizable reinforced container 102 adapted to carry vehicle-related accessories. The vehicle-related accessories can include items needed at automotive events, such as autocross or HPDE (High Performance Driving Events).

Figure 2A:
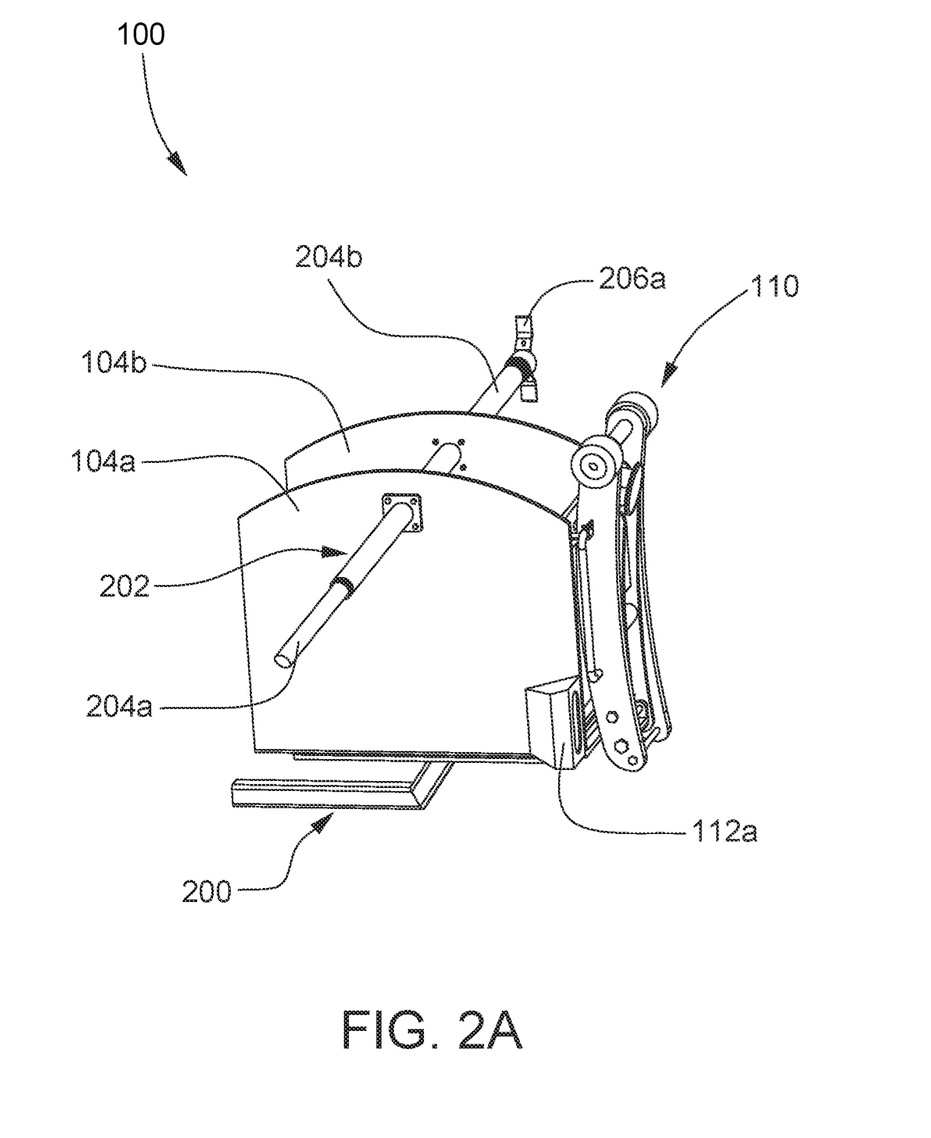
FIG. 2A illustrates a left-side perspective view of the towable vehicle equipment carrying apparatus shown in FIG. 1 with a jack attached to the apparatus, in accordance with an embodiment of the present invention.

The container 102 can be easily hitched to a vehicle for towing. The container 102 includes a hitch 200, such as a dual right-angle extension hitch, which is adapted for coupling with a receiver hitch on a vehicle 106. The hitch 200 enable universal towing of the apparatus 100 by any style or size of vehicle. The reinforced container 102 has a sizable cavity 116 that can retain a fuel canister, a drawer 115 (FIG. 6) to retain tools, a wheel retention pole 202 comprising a pair of flanges 206a-b to retain spare wheels or tires, and multiple hooks 108a-b to retain a jack 110 as shown in FIG. 2A. The reinforced container 102 is sufficiently small and lightweight in dimensions, so as to facilitate towing thereof.

Figure 2B:
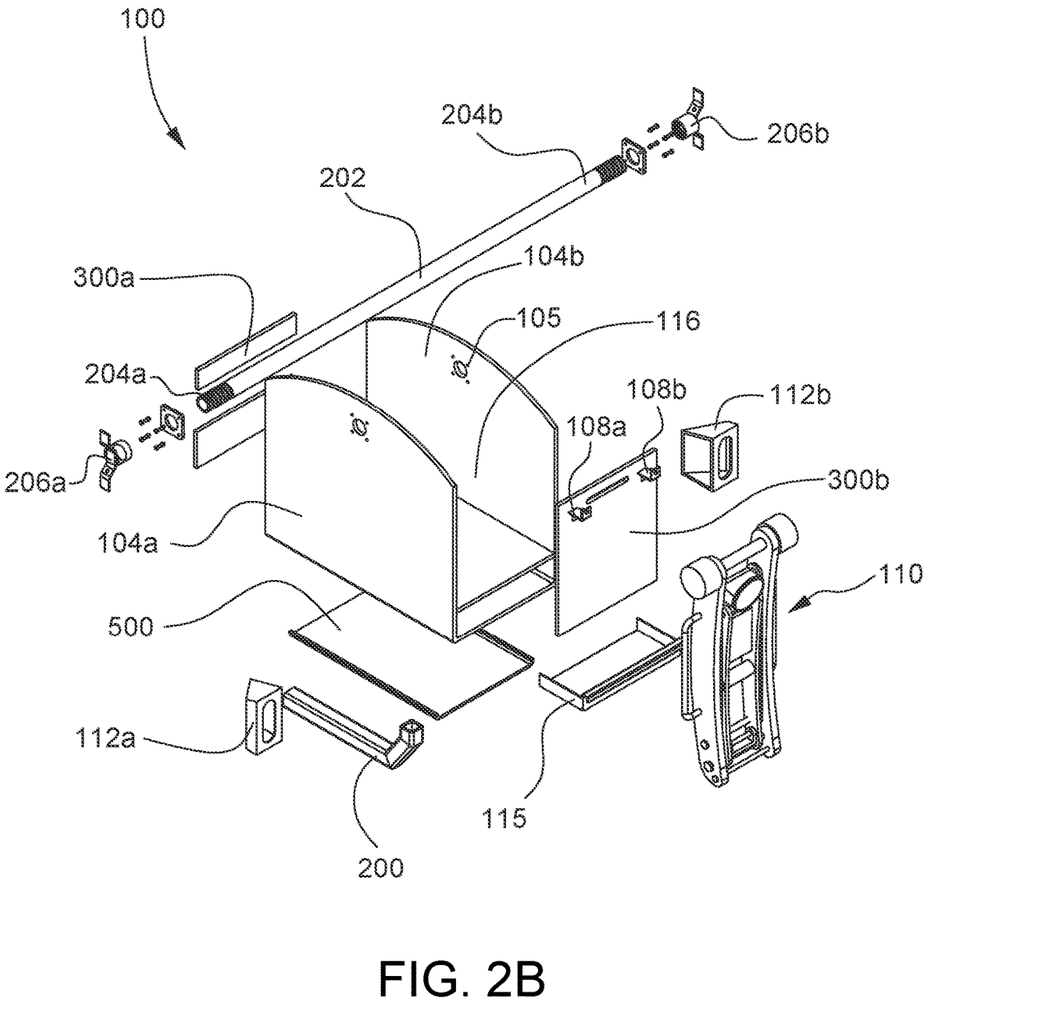
FIG. 2B illustrates an exploded view of the towable vehicle equipment carrying apparatus shown in FIG. 2A, in accordance with an embodiment of the present invention.

FIG. 2B illustrates an exploded view of the towable vehicle equipment carrying apparatus 100 as shown in FIG. 2A, in accordance with an embodiment of the present invention, wherein the apparatus comprises a reinforced container 102 having the walls (300a, 300b, 500 and 104a-b) forming a cavity 116; a wheel retention pole 202 with a pair of security flanges 206a-b at both free ends 204a-b of the pole 202; one or more hooks 108a-b provided with locking pins 109 to detachably attach a jack 110; at least one drawer 115; a hitch 200 and a pair of lighting signal 112a-b.

One aspect of a towable vehicle equipment carrying apparatus 100, shown in FIG. 1 and FIG. 2A, comprises: a reinforced container 102, wherein the container 102 is configured to carry at least one accessory; a wheel retention pole 202 with a pair of security flanges 206a-b at both free ends 204a-b of the pole 202, wherein the pole 202 is length adjustable and is attached to the container 102 to detachably attach at least one spare wheel (not shown); one or more hooks 108a-b fixedly attached to the container 102, wherein the hooks 108a-b is provided with locking pins 109 to detachably attach accessories 110; at least one drawer 115, wherein the drawer 115 is adapted to slide in and out of the container 102; a hitch 200 detachably attaches to lower portion of the container 102, wherein the hitch 200 is adapted to detachably couple the apparatus 100 to a hitch receiver 700 of a vehicle 106; and a rear hitch 114 fixedly attached to the container 102, wherein the rear hitch 114 (shown in FIG. 1) is adapted to enable hitching another vehicle in series.

In another aspect, the reinforced container 102 is made of metal selected from a group consisting of reinforced steel, titanium, or metal alloy.

In another aspect as shown in FIG. 2A-B, the apparatus 100 is configured to carry at least of the following: a fuel canister, a tool, a tool box, an automobile part, a jack 110, a gas cylinder, objects not fitting inside the vehicle, and a combination thereof.

Figure 7:
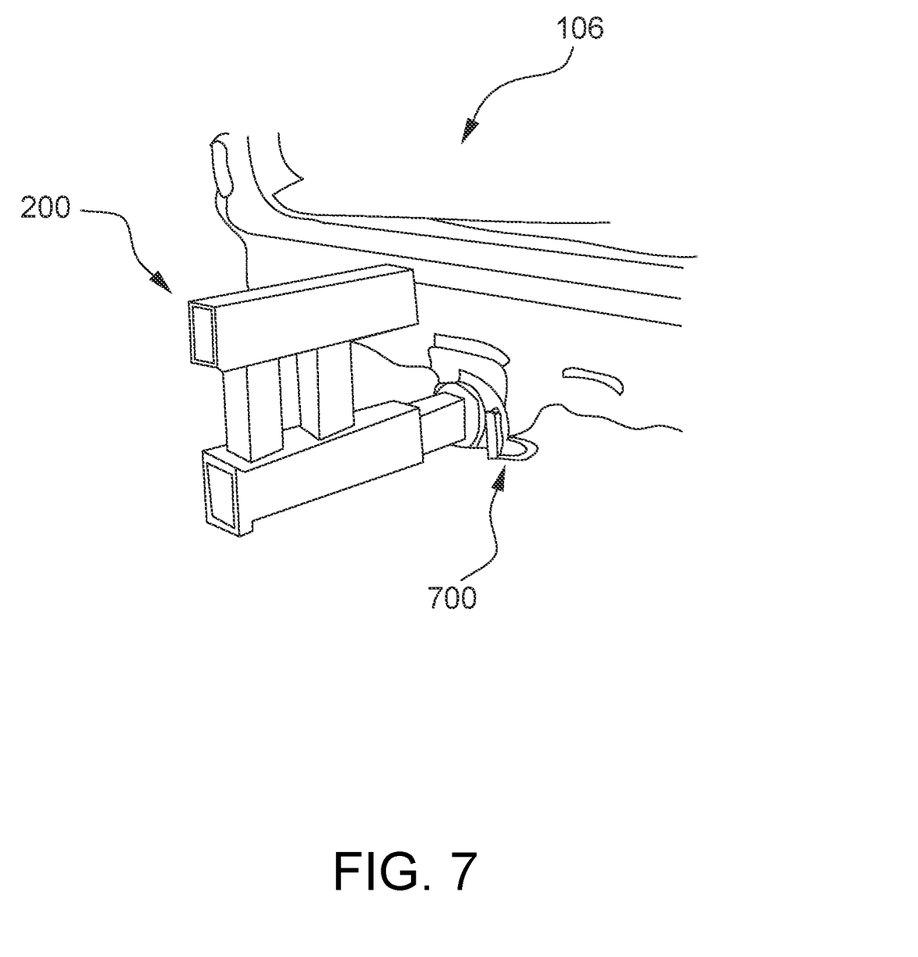
FIG. 7 illustrates a perspective view of an exemplary dual right-angle extension hitch, in accordance with an embodiment of the present invention.

In another aspect as shown in FIG. 7, the hitch 200 comprises a dual right-angle extension hitch with a detachable locking pin (not shown).

Figure 10:
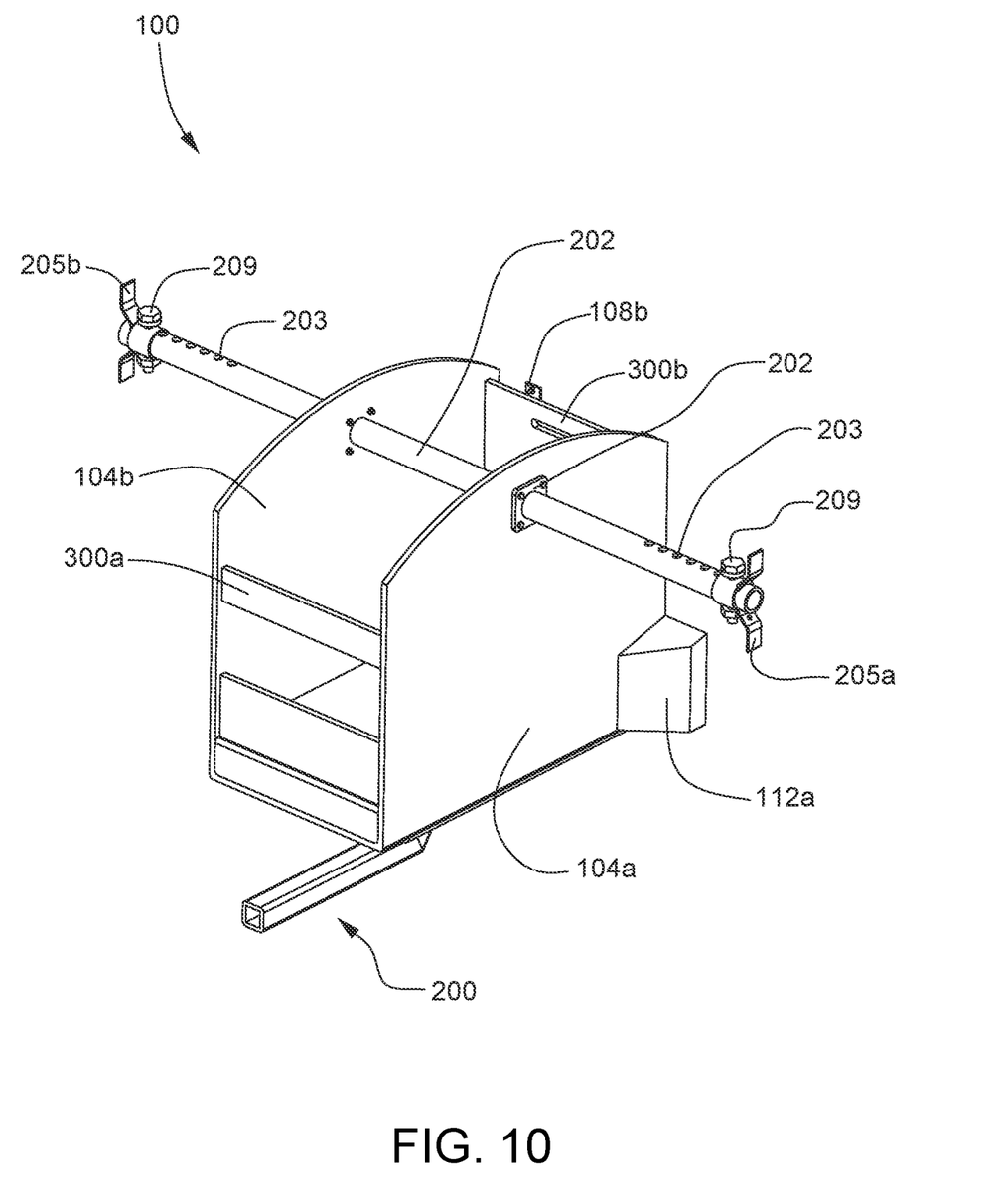
FIG. 10 illustrates a front perspective view of the towable vehicle equipment carrying apparatus with the alternate flanges as shown in FIG. 9 that facilitate to adjustably lock along the length of the wheel retention pole, in accordance with an embodiment of the present invention.

In another aspect as shown in FIG. 10, the security flanges 205a-b comprise at least one hole 207 and a locking pin 209 that is configured to detachably and adjustably lock with corresponding holes 209 on the length of the wheel retention pole 202 at its free ends 204a-b, thereby allowing detachable tight attachment of variable sized wheels to the free ends 204a-b of the pole 202.

In another aspect as shown in FIG. 1, FIG. 2A-B, a towable portable vehicle equipment carrying apparatus 100, wherein the apparatus 100 comprising: a reinforced container 102 having a front wall 300a, a rear wall 300b, a bottom wall 500, and a pair of side walls 104a-b, the walls (300a, 300b, 500 and 104a-b) forming a cavity 116 sized and dimensioned to retain at least one accessory, the rear wall comprising at least one hook 109, a drawer 115 and at least one lighting signal 112a-b, the sidewalls 104a-b defining a pair of aligned holes 105; a hitch 200 attached to the bottom wall 500 of the container 102, wherein the hitch 200 is adapted to detachably couple the container 102 to a hitch receiver 700 of a vehicle 106; a wheel retention pole 202 disposed through the holes 105 in the sidewalls 104a-b, the wheel retention pole 202 terminating at a pair of free ends 204a-b, the wheel retention pole 202 adapted to carry at least one wheel or tire (not shown); a pair of security flanges 206a-b joined with the free ends 204a-b of the wheel retention pole 202, the security flanges 206a-b selectively restricting passage of the wheel or tire past the free ends 204a-b of the wheel retention pole 202; and at least two mobile members (not shown) operatively joined to the bottom wall 500 to enable mobility of the container 102.

Figure 6:
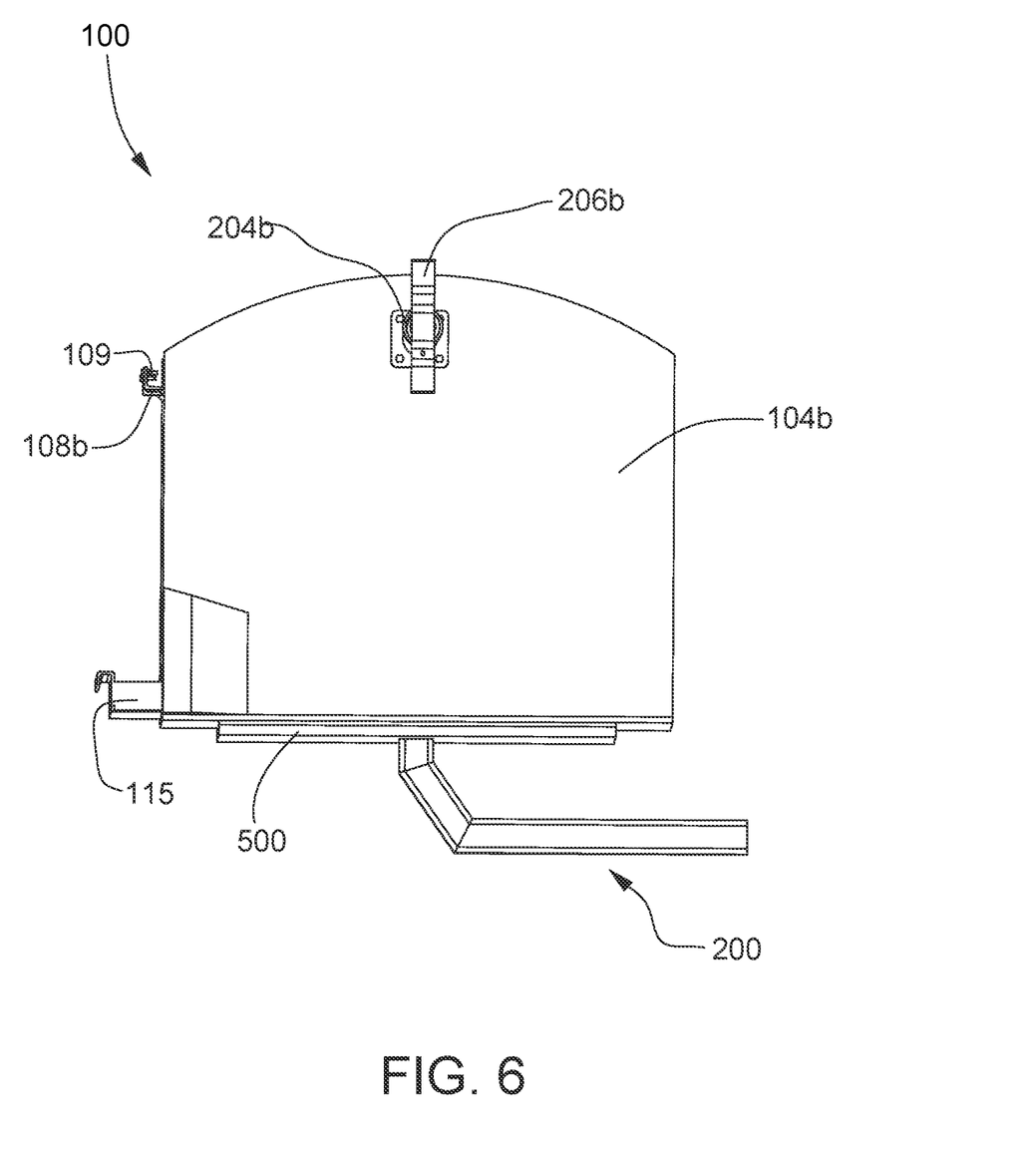
FIG. 6 illustrates a side view of the towable vehicle equipment carrying apparatus shown in FIG. 1, showing a drawer at open position, hitch, hook, and the side wall, in accordance with an embodiment of the present invention.

In another aspect as shown in FIG. 6, the rear wall 300b comprises at least one drawer 115 adapted to slide in and out of the cavity 116, and contain the at least one vehicle-related accessory.

In another aspect as shown in FIG. 2A-B, the accessory includes at least one of the following: a fuel canister, a tool, a tool box, an automobile part, a jack 110, a gas cylinder, objects not fitting inside the vehicle, and a combination thereof.

Figure 3:
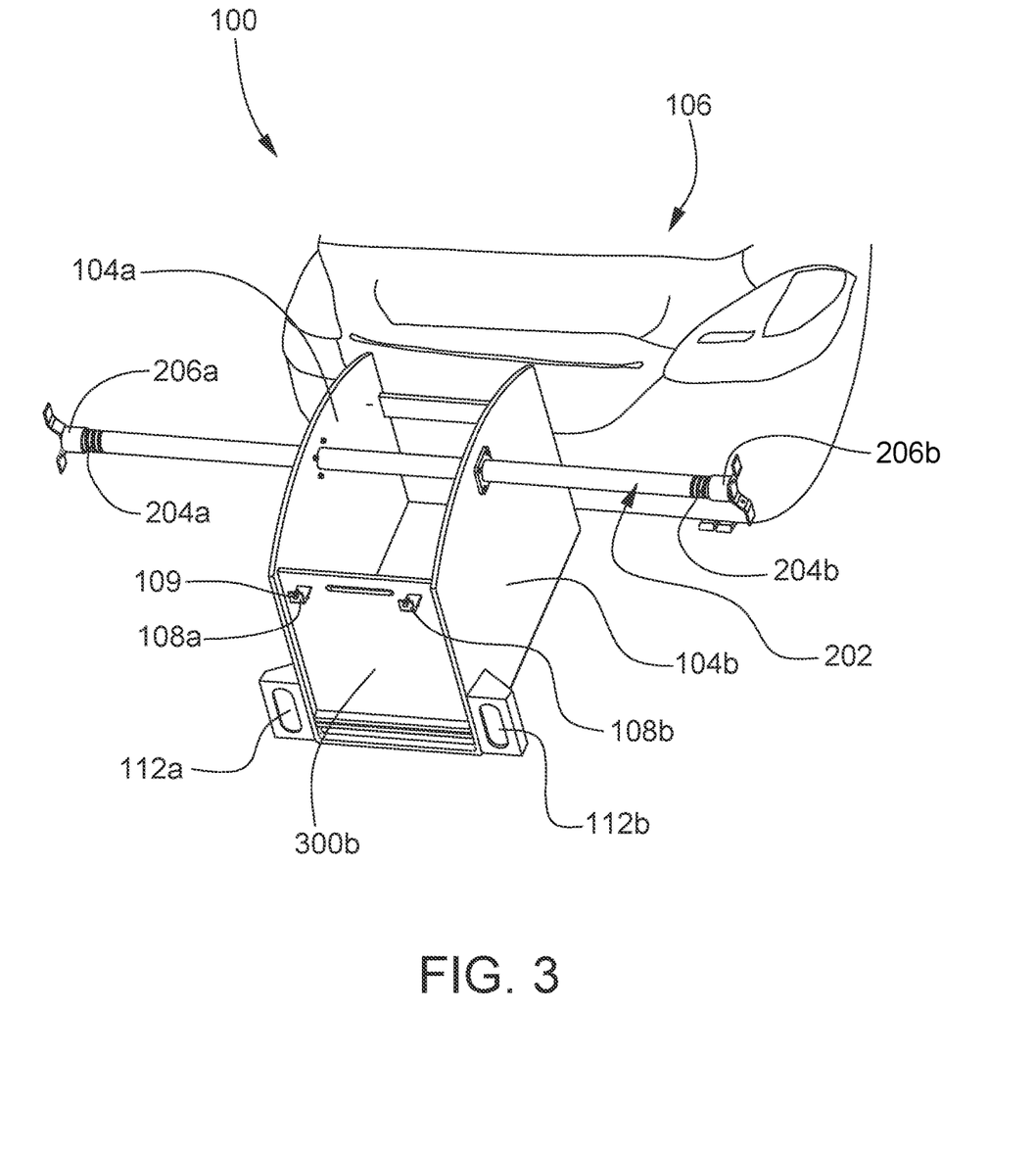
FIG. 3 illustrates a top right-side perspective view of the towable vehicle equipment carrying apparatus shown in FIG. 1 showing its attachment to the vehicle and clearly disclosing cavity of the container of the apparatus, in accordance with an embodiment of the present invention.
Figure 5:
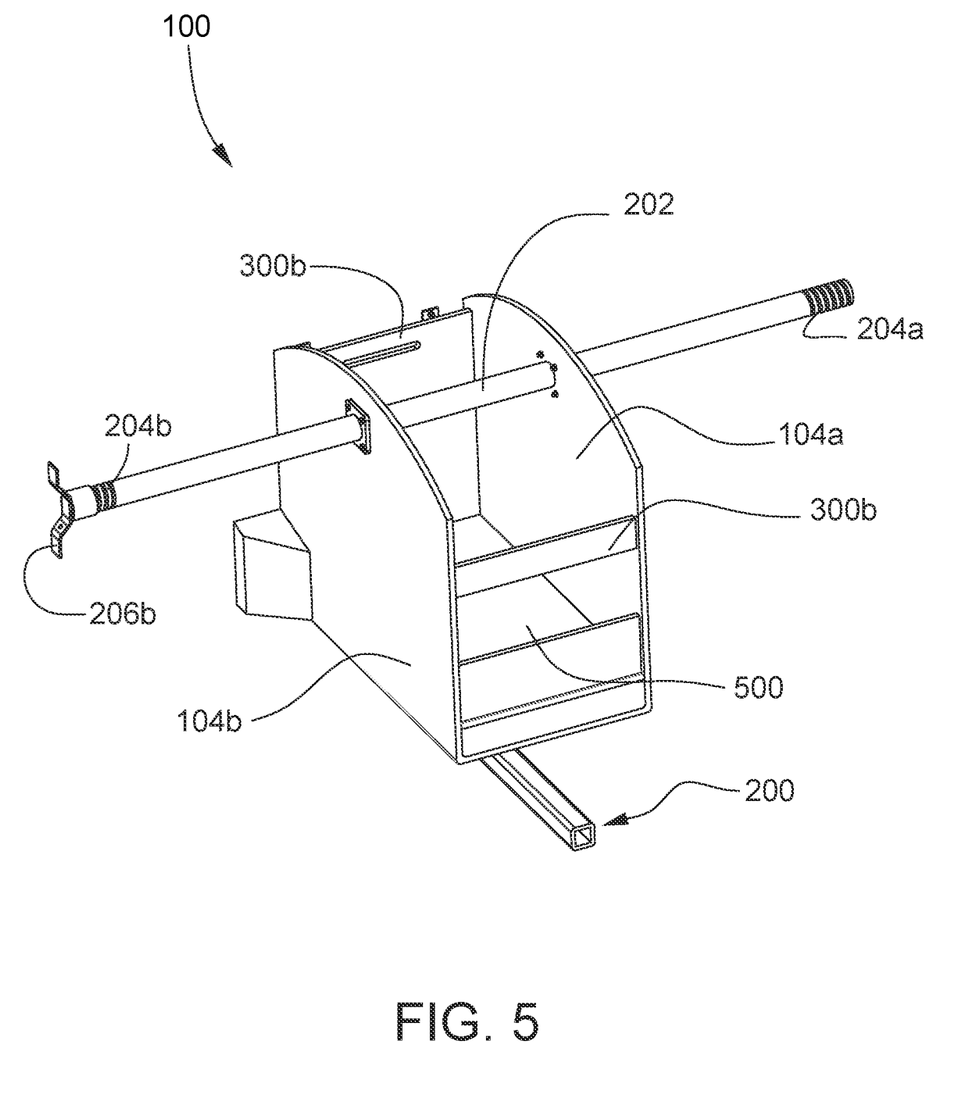
FIG. 5 illustrates a front perspective view of the towable vehicle equipment carrying apparatus shown in FIG. 1 showing cavity, front wall, wheel retention pole with other elements of the apparatus, in accordance with an embodiment of the present invention.

In another aspect as shown in FIGS. 1, 3, and 5, the reinforced container 102 defines a cuboid or rectangular shape.

In another aspect, the reinforced container 102 is made of metals selected from a group consisting of reinforced steel, titanium, or metal alloy.

In another aspect as shown in FIG. 7, the hitch 200 comprises a dual right-angle extension hitch with a detachable locking pin (not shown).

Figure 8:
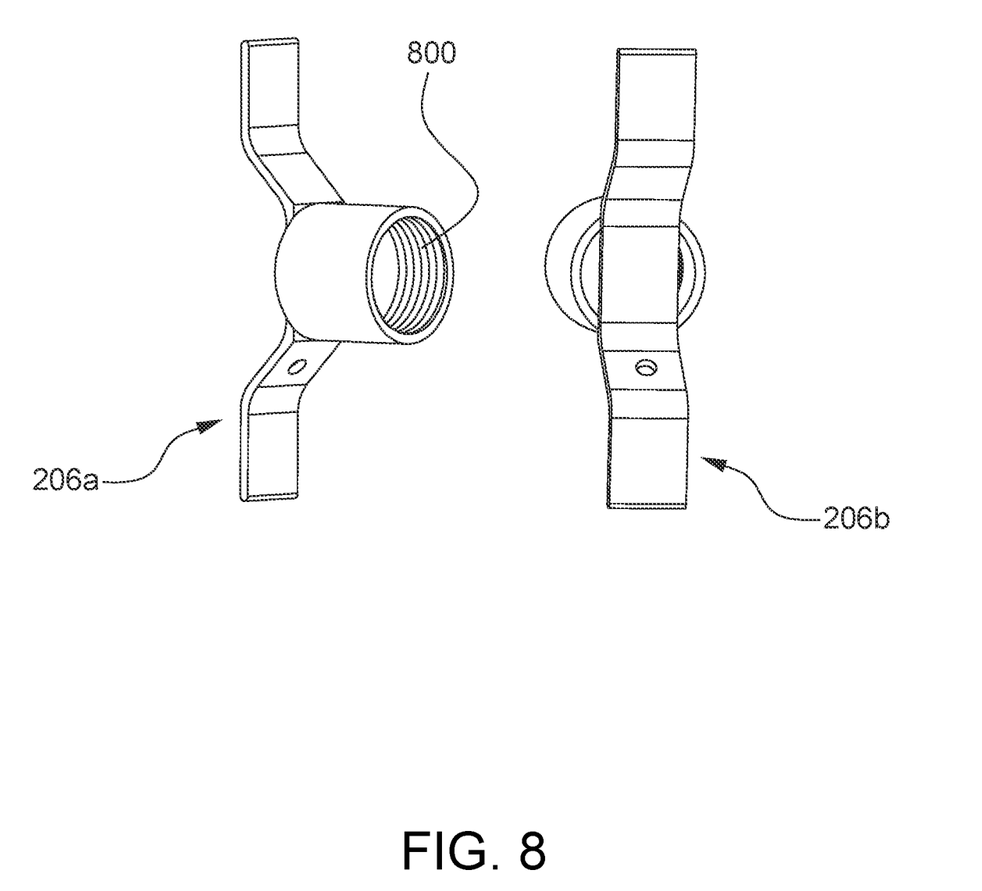
FIG. 8 illustrates a of an exemplary pair of security flanges that are threaded spinners, showing a side view and a top view of the threaded spinners, in accordance with an embodiment of the present invention.

In another aspect as shown in FIG. 8, the pair of security flanges 206a-b comprises threaded spinners.

In another aspect as shown in FIG. 5, the free ends 204a-b of the wheel retention pole 202 are threaded that are configured to detachably attach the security flanges 206a-b.

In another aspect, the multiple mobile members comprise at least a pair of wheels.

In another aspect, the lighting signals 112a-b on the rear wall is a photo luminescent sticker.

In another aspect, the lighting signals 112a-b are configured to receive power from the vehicle to get illuminated.

In another aspect, a top wall is pivotally attached to top edges of the side walls 104*a-b* to function as a lid (not shown) for the container 102.

In another aspect as shown in FIG. 2, the wheel retention pole 202 is length adjustable.

In another aspect as shown in FIG. 2A-B, the hook is provided with a locking pin 109 to detachably attach a jack 110 to the apparatus 100.

Those skilled in the art will recognize that car enthusiasts participate in events at remote locations that necessitate a need for a diverse set of tires, a jack, tools, fuel, etc. to be transported to the event location. Traditionally the car enthusiast either loads the vehicle, or tows a trailer. The present disclosure teaches a carrying means that negates the need for giving up the cargo or people carrying capacity of the vehicle, and negates the headaches associated with a full-sized trailer. The car enthusiast simply loads the vehicle-related items into the reinforced container 102. The vehicle-related items are securely stored and accessible while not needing additional parking space for a full-sized trailer.

Turning now to FIG. 2A showing the side perspective view of the apparatus 100 with a jack attached to the apparatus, FIG. 2B illustrates an exploded view of the towable vehicle equipment carrying apparatus shown in FIG. 2A and FIG. 3 showing the top perspective view of the apparatus 100, wherein the apparatus 100 comprises a reinforced container 102 having a front wall 300*a*, a rear wall 300*b*, a bottom wall 500, and a pair of side walls 104*a*, 104*b*, the walls forming a cavity 116 that is sized and dimensioned to retain at least one vehicle-related accessory. In some embodiments, the vehicle-related accessory may include, without limitation, a fuel canister, a tool, and an auto part. The reinforced container 102 defines a cubicle or rectangular shape. The reinforced material composition of the container is especially useful for suitable materials for the reinforced container 102 may include, without limitation, reinforced steel, titanium, or metal alloy.

Turning now to FIG. 3, the front wall 300*a* of the container 102 comprising a hitch 200. The hitch is configured to enable detachable coupling with a vehicle receiver 700, including a tow bar, extending from the rear bumper area of a vehicle 106. Once hitched, the container 102 can couple to the vehicle receiver 700 and be secured with a pin or other hitch locking mechanism known in the art. In one non-limiting embodiment, the hitch comprises a dual right-angle extension hitch.

For example, FIG. 7 illustrates a perspective view of an exemplary dual right-angle extension hitch. In alternative embodiments, no hitch is used, but rather the dual right-angle extension hitch extending from the vehicle fastens directly to the bottom wall 500 of the container 102. In alternative embodiments, the apparatus further comprises a rear hitch 114 as shown in FIG. 1 that is adapted to enable hitching to the vehicle 106, or another apparatus hitched in series.

Figure 4:
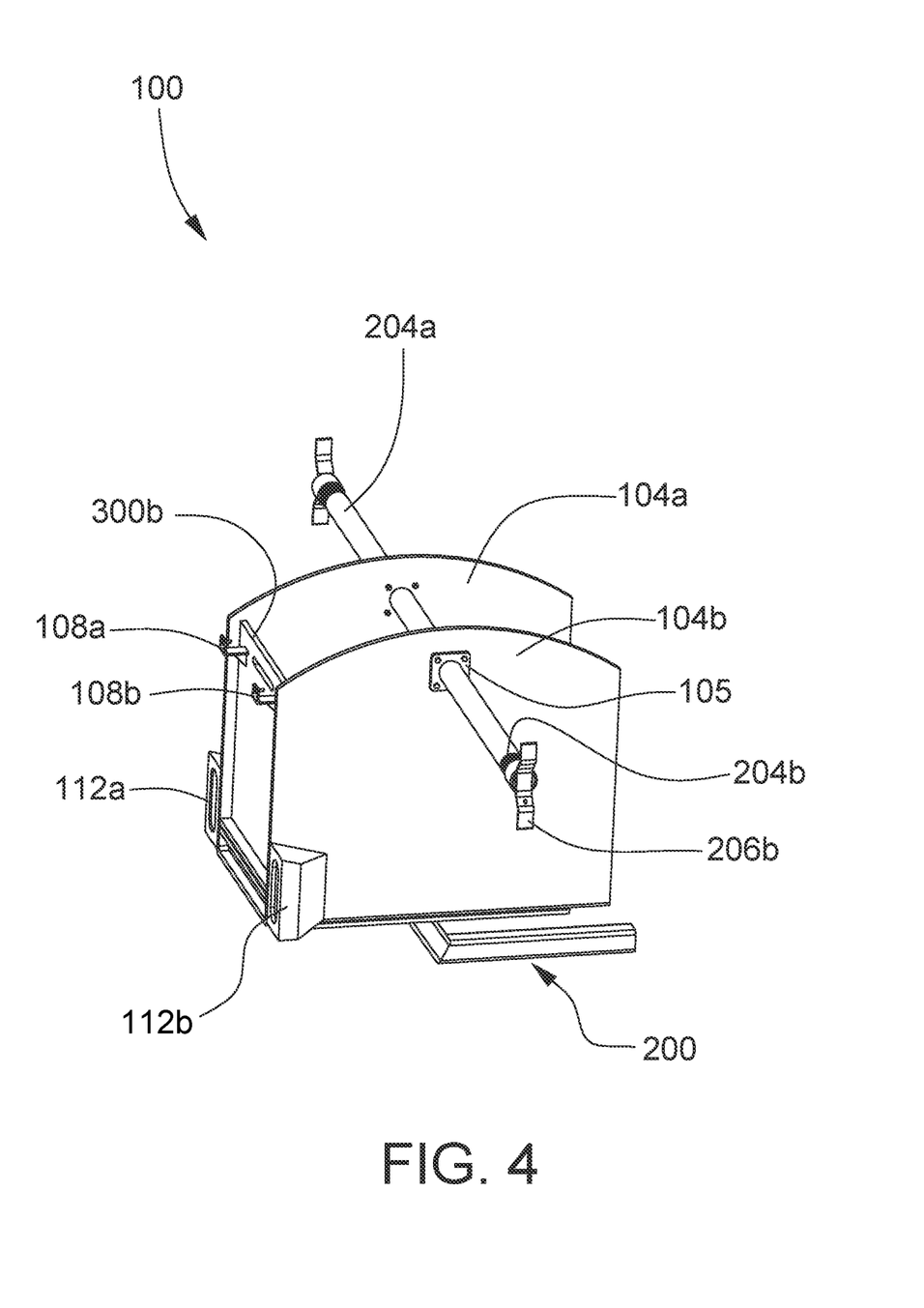
FIG. 4 illustrates a top right-side view of the towable vehicle equipment carrying apparatus shown in FIG. 1 showing hitch, hook, and lighting signal with other elements of the apparatus, in accordance with an embodiment of the present invention.

As referenced in FIG. 4, the rear wall 300*b* of the container 102 comprising at least one hook 108*a-b* that is adapted to carry a jack 110. As illustrated, a pair of spaced apart hooks retain the jack (See FIG. 1). As shown in FIG. 2A-B, the hook 108*a-b* further comprises a locking pin 109 to lock the jack to remain in the desired position while transportation. The jack can include a mechanism that incrementally lifts a vehicle for maintenance or changing tires. In other embodiments, the rear wall 300*b* has at least one lighting signal 112*a*, 112*b*, such as brake lights known in the art of towing and trailers.

In other embodiments as shown in FIG. 6, the rear wall 300*b* of the container 102 comprises at least one drawer 115 that is adapted to slide in and out of the cavity, and contain the at least one vehicle-related accessory. For operation of the drawers 115, a pair of rails may or may not be included on the inside of the side walls 104*a*, 104*b* enable slidable translation in and out of the cavity of the container 102.

In some embodiments, the side walls 104*a-b* have a convex upper edge. In other embodiments, the side walls 104*a-b* can have a flat upper edge that is adapted to receive a lid or top wall (not shown). Furthermore, the side walls 104*a*, 104*b* of the container 102 define a pair of aligned holes 105 that are sized and dimensioned to enable passage of the wheel retention pole 202 as shown in FIG. 2A-B. The holes 105 can be circular in shape to receive a cylindrically shaped wheel retention pole 202.

In some embodiments, the wheel retention pole 202 is centrally disposed through the holes in the sidewalls. In this arrangement, the wheel retention pole 202 extends laterally from each side of the container 102. As FIG. 5 shows, the wheel retention pole 202 is a long, cylindrical member that can receive and securely carry at least one wheel or tire. The wheel retention pole 202 can be length adjustable to accommodate different vehicles and roadways during towing. As referenced in FIG. 6, the wheel retention pole 202 terminates at a pair of free ends 204*a-b*. In one possible embodiment, the free ends 204*a-b* are threaded to enable coupling with the security flanges 206*a-b*, as described below.

Turning now to FIG. 8, a pair of security flanges 206*a-b* join each of the free ends 204*a-b* of the wheel retention pole 202. The security flanges 206*a-b* are configured to selectively restrict the passage of the wheel or tire past the free ends 204*a-b* of the wheel retention pole 202; serving as a buffer of sorts. In one possible embodiment, the security flanges 206*a-b* comprise threaded spinners, known in the art of wheel security.

In this configuration, the wheel retention pole 202 is simply a horizontal tube, which is threaded at the ends to hold tires which are secured in place by threaded spinners. The threaded spinners, which also have a correlating thread 800, can be locked to the tire via lug bolt hole via a padlock. In alternative embodiments, the threaded spinners may be hollow to allow for the storage of the jack handle inside the tube.

Figure 9:
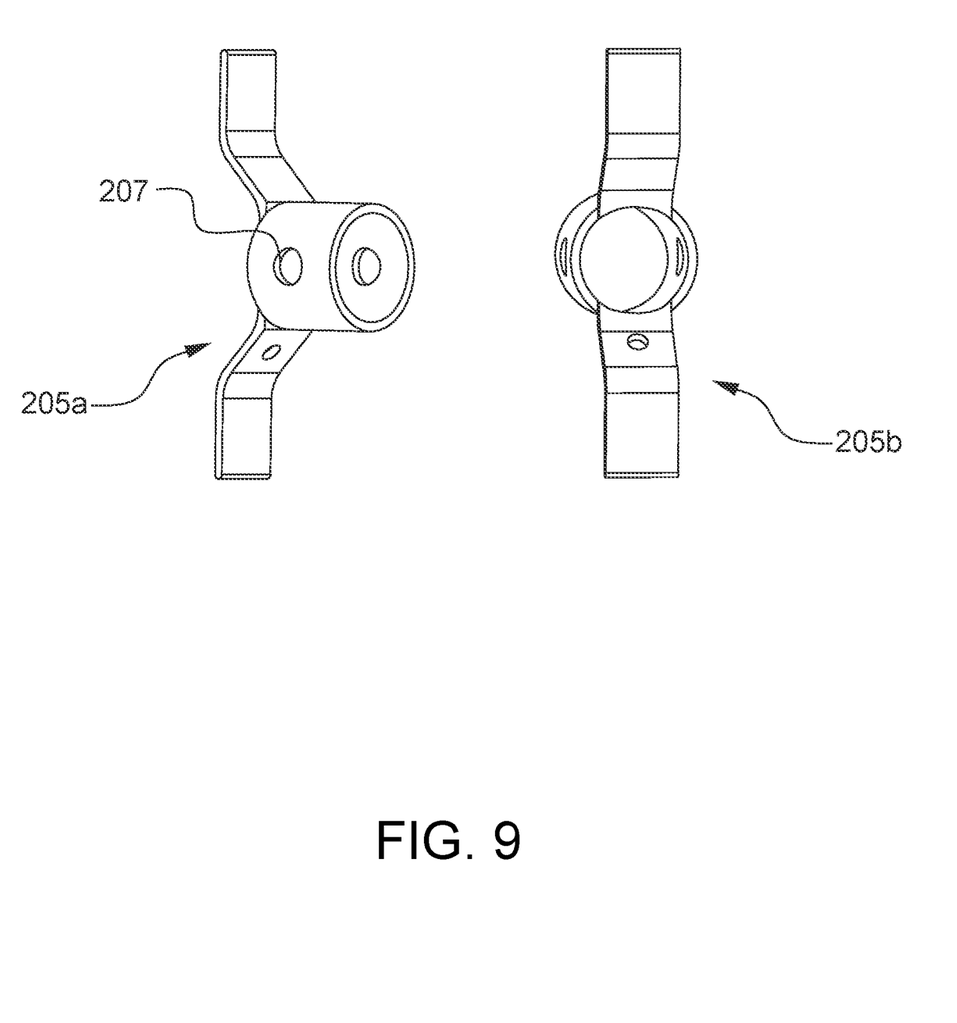
FIG. 9 illustrates an exemplary pair of security flanges with a hole and locking pin to securely hold at least one wheel along the length of the wheel retention pole, it shows a side view and a top view of the exemplary pair of security flanges, in accordance with an alternate embodiment of the present invention.

According to an alternative embodiment as shown in FIG. 9 an exemplary pair of security flanges 205*a-b* with a hole 207 and locking pin 209 to securely hold at least one wheel along the length of the wheel retention pole 202, it shows a side view and a top view of the exemplary pair of security flanges 205*a-b*, in accordance with an alternate embodiment of the present invention.

FIG. 10 illustrates a front perspective view of the towable vehicle equipment carrying apparatus 100 with the alternate flanges 205*a-b* as shown in FIG. 9 that facilitate to adjustably lock along the length of the wheel retention pole 202, in accordance with an embodiment of the present invention. A plurality of holes on the free ends 204*a-b* of the wheel retention pole 202 allows the holes 207 on the alternate flanges 205*a-b* to get locked by a locking pin 209, thereby allowing detachable tight attachment of variable sized wheels to the free ends 204*a-b* of the pole 202.

In some embodiments, the apparatus 100 comprises multiple mobile members that are operatively joined at the bottom wall 500. The mobile members are configured to roll or slide against the ground, so as to enable mobility of the container 102 when being towed. In some embodiments, the multiple mobile members comprise tires, rollers, or sleds. In any case, the mobile members enable facilitated towing of the container 102.

In conclusion, the apparatus 100 provides a portable, organizable reinforced container 102 adapted to carry vehicle-related accessories. The vehicle-related accessories can include items needed at automotive events, such as autocross or HPDE (High Performance Driving Events). The reinforced container 102 is sufficiently small and lightweight in dimensions, so as to facilitate towing thereof. The container 102 can be easily hitched to a vehicle 106 for towing.

In other embodiments, the container 102 includes a hitch, such as a dual right-angle extension hitch, which is adapted for coupling with a receiver hitch on a vehicle, so as to be towed. The reinforced container 102 can retain a fuel canister, a drawer 115 to retain tools, a pair of lateral bars to retain spare wheels, and multiple hooks to retain a jack. The reinforced container 102 is sufficiently small and lightweight in dimensions, so as to facilitate towing thereof.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A towable vehicle equipment carrying apparatus, wherein the apparatus comprises:
    a reinforced container, wherein the container is configured to carry at least one accessory;
    a wheel retention pole with a pair of security flanges at both free ends of the pole, wherein the pole is length adjustable and is attached to the container to detachably attach at least one spare wheel;
    one or more hooks fixedly attached to the container, wherein the hooks are provided with locking pins to detachably attach one of the accessories;
    at least one drawer, wherein the drawer is adapted to slide in and out of the container;
    a hitch detachably attaches to lower portion of the container, wherein the hitch is adapted to detachably couple the apparatus to a hitch receiver of a vehicle; and
    a rear hitch fixedly attached to the container, wherein the rear hitch is adapted to enable hitching another vehicle in series.

2. The apparatus of claim 1, wherein the reinforced container is made of metal selected from a group consisting of reinforced steel, titanium, and metal alloy.

3. The apparatus of claim 1, wherein the apparatus is configured to carry at least of the following: a fuel canister, a tool, a tool box, an automobile part, a jack, a gas cylinder, objects not fitting inside the vehicle, and a combination thereof.

4. The apparatus of claim 1, wherein the hitch comprises a dual right-angle extension hitch with a detachable locking pin.

5. The apparatus of claim 1, wherein the security flanges comprise at least one hole and a locking pin that is configured to detachably and adjustably lock with corresponding holes on the length of the wheel retention pole at its free ends, thereby allowing detachable tight attachment of variable sized wheels to the free ends of the pole.

6. A towable portable vehicle equipment carrying apparatus, wherein the apparatus comprises:
    a reinforced container having a front wall, a rear wall, a bottom wall, and a pair of side walls, the walls forming a cavity sized and dimensioned to retain at least one accessory,
    the rear wall comprising at least one hook, a drawer and at least one lighting signal,
    the sidewalls defining a pair of aligned holes;
    a hitch attached to the bottom wall of the container, wherein the hitch is adapted to detachably couple the container to a hitch receiver of a vehicle;
    a wheel retention pole disposed through the holes in the sidewalls, the wheel retention pole terminating at a pair of free ends, the wheel retention pole adapted to carry at least one wheel or tire;
    a pair of security flanges joined with the free ends of the wheel retention pole, the security flanges selectively restricting passage of the wheel or tire past the free ends of the wheel retention pole; and
    at least two mobile members operatively joined to the bottom wall to enable mobility of the container.

7. The apparatus of claim 6, wherein the rear wall comprises at least one drawer adapted to slide in and out of the cavity.

8. The apparatus of claim 6, wherein the accessory includes at least one of the following: a fuel canister, a tool, a tool box, an automobile part, a jack, a gas cylinder, objects not fitting inside the vehicle, and a combination thereof.

9. The apparatus of claim 6, wherein the reinforced container defines a cuboids shape.

10. The apparatus of claim 6, wherein the reinforced container is made of metals selected from a group consisting of reinforced steel, titanium, or metal alloy.

11. The apparatus of claim 6, wherein the hitch comprises a dual right-angle extension hitch with a detachable locking pin.

12. The apparatus of claim 6, wherein the pair of security flanges comprises threaded spinners.

13. The apparatus of claim 6, wherein the free ends of the wheel retention pole are threaded that are configured to detachably attach the security flanges.

14. The apparatus of claim 6, wherein the mobile members comprise at least a pair of wheels.

15. The apparatus of claim 6, wherein the lighting signal on the rear wall is a photo luminescent sticker.

16. The apparatus of claim 6, wherein the lighting signals are configured to receive power from the vehicle to get illuminated.

17. The apparatus of claim 6, wherein a top wall is pivotally attached to top edges of the side walls to function as a lid for the container.

18. The apparatus of claim 6, wherein the wheel retention pole is length adjustable.

19. The apparatus of claim 6, wherein the rear wall further comprises a rear hitch adapted to enable hitching another vehicle in series.

20. The apparatus of claim 6, wherein the hook is provided with a locking pin to detachably attach a jack to the apparatus.

* * * * *